United States Patent Office 3,187,045
Patented June 1, 1965

3,187,045
PREPARATION OF TRANS 1,2-DIAMINO-
CYCLOHEXANE
Andrew I. Smith, Raleigh, N.C., assignor, by mesne assignments, to Monsanto Company, a corporation of Delaware
No Drawing. Filed Dec. 28, 1961, Ser. No. 162,951
5 Claims. (Cl. 260—563)

This invention relates to the preparation of trans 1,2-diaminocyclohexane, and more specifically to the separation of trans 1,2-diaminocyclohexane from stereoisomeric mixtures of cis and trans 1,2-diaminocyclohexane, which mixtures may also contain additional minor impurities.

The 1,2-diaminocyclohexanes are known compounds which are valuable intermediate products for the production of dyestuffs, textile assistants, fungicides, pesticides and pharmaceutical products.

Various methods have been proposed for the production of 1,2-diaminocyclohexane, e.g., the reduction of o-phenylenediamine and the reduction of 1,2-dinitrocyclohexane. Most of these prior art methods result in the production of a stereoisomeric mixture of cis and trans 1,2-diaminocyclohexane in varying proportions. Such mixtures of isomers are also produced by fractionating impurity concentrate streams which are discarded during the preparation of refined hexamethylene diamine by hydrogenation of adiponitrile for nylon manufacture.

In a typical purification of hexamethylene diamine prepared by hydrogenation of adiponitrile there is recovered an impurity stream which is presently discarded composed of water (9%) hexamethyleneimine (6%) hexamethylene diamine (67%) 1,2-diaminocyclohexane (17%) and trace amounts of other materials. By fractionating this mixture a reasonably pure 1,2-diaminocyclohexane fraction may be obtained and this is a very economical source of trans 1,2-diaminocyclohexane, if the product can be separated from the cis isomer and from the various impurities associated therewith.

Though it has been desired to resolve the above-described isomeric mixtures into substantially pure cis and trans 1,2-diaminocyclohexane for purposes of conducting characterization and chemical tests and for preparing derivatives free from the derivatives of the other isomer, no economically attractive method has heretofore been developed. Though separation of the two isomers has been attempted by fractional distillation, it has been found that satisfactory separation cannot be obtained even when using a 100 theoretical plate distillation column at reduced pressures as low as 50 mm.

It is an object of the present invention to provide a method for the preparation of substantially pure trans 1,2-diaminocyclohexane by the separation thereof from a mixture containing both the cis and trans isomer forms of 1,2-diaminocyclohexane.

It is a further object of this invention to provide such a process which is simple, economical and efficient.

It is a further object of this invention to provide a method for the preparation of substantially pure trans 1,2-diaminocyclohexane which involves the separation thereof from a mixture containing both cis and trans isomers as well as other minor impurities which may be present when the diaminocyclohexane mixture is obtained by fractionation from the diaminocyclohexane-containing by-product stream discarded in the commercial preparation of hexamethylene diamine by hydrogenation of adiponitrile.

Still further objects and advantages of the present invention will become apparent from the detailed description given hereinafter; it should be understood, however, that the detailed description and specific examples, while indicating preferred embodiments, are given by way of illustration only, since various changes and modifications within the spirit and scope of the invention will become apparent to those skilled in the art.

The above objects are accomplished according to this invention by treating an aqueous solution of an isomeric mixture of cis and trans 1,2-diaminocyclohexane with sulfuric acid whereupon the trans form of 1,2-diaminocyclohexane sulfate is precipitated. The sulfate is recovered by suitable means, such as filtration, decantation, centrifugation, etc., washed and further purified if desired. Thereupon, it is treated with an alkali hydroxide solution to liberate the trans 1,2-diaminocyclohexane in substantially pure form. Recovery may then be effected by any convenient method, and purification carried out.

During the above step of treating with sulfuric acid it has been found that the cis form of 1,2-diaminocyclohexane forms substantially soluble sulfate salts, and this cis form as well as other minor impurities are thereby separated from the insoluble sulfate of the trans isomer.

In carrying out the above process, sulfuric acid is added slowly, while continuously stirring, to an aqueous solution containing cis and trans 1,2-diaminocyclohexane. For convenience, it is preferred to add the sulfuric acid as an aqueous solution. Though precipitation starts rapidly, the addition of sulfuric acid solution should be continued until complete neutralization of all diaminocyclohexane and basic impurities is indicated by acid pH, and preferably below pH 3.

After completion of the acid addition step, the mixture should then be cooled and maintained at a temperature below 30° C. to insure good separation of the precipitate. If convenient, cooling can be carried out over night. The mixture is then filtered to recover the precipitated trans 1,2-diaminocyclohexane sulfate and the precipitate washed with water and then preferably with boiling water before drying.

To liberate free trans 1,2-diaminocyclohexane, the sulfate salt is treated with at least a molar equivalent of an alkali hydroxide solution, such as sodium hydroxide, potassium hydroxide, or ammonium hydroxide, or until neutralization is complete as indicated by a pH of at least 8. During addition of the alkali hydroxide solution to the salt, care should be taken to prevent the temperature of the reaction mixture from rising too high. This can be effected by dissolving the salt in water to form an aqueous solution thereof prior to treatment, maintaining the reaction mixture in a cooling bath, and adding the alkali hydroxide solution in small increments. Generally, the temperature of the solution should not be allowed to exceed 30° C.

The resulting neutralized reaction mixture will normally consist of three phases, an upper phase of trans 1,2-diaminocyclohexane with some dissolved water, a lower liquid phase of an aqueous solution of alkali sulfate with some dissolved diaminocyclohexane, and a solid phase of precipitated alkali sulfate. The upper phase can be decanted from the two lower phases and dried to yield a relatively pure trans 1,2-diaminocyclohexane.

If a more highly purified trans 1,2-diaminocyclohexane is desired the neutralized reaction mixture is then extracted several times with a suitable solvent such as ether or ether-alcohol mixtures, e.g. ether-butanol, ether-pentanol, etc. The extract solution is then conveniently evaporated and the concentrate fractionated to obtain a substantially pure trans 1,2-diaminocyclohexane.

The following example is given to more particularly illustrate the process of the invention. All parts and percentages are by weight unless otherwise indicated.

*Example*

Three hundred grams of a 1,2-diaminocyclohexane concentrate, prepared by fractionation of a semi-refined diaminocyclohexane fraction obtained from an impurity stream normally discarded during the manufacture of hexamethylene diamine by hydrogenation of adiponitrile, was added to 2220 ml. of water. The 1,2-diaminocyclohexane concentrate comprised a mixture of two parts of trans 1,2-diaminocyclohexane per part of the cis isomer. To the solution there was slowly added drop-wise, while stirring, a solution of sulfuric acid composed of 142 ml. of concentrated sulfuric acid, 96%, in 280 ml. of water. It was noted that precipitation of a white solid started almost immediately. Addition of the sulfuric acid solution was halted when the pH of the mixture was 6. Thereafter, a 5% solution of sulfuric acid was added drop-wise until the pH of the reaction mixture fell to 1.0 showing complete neutralization of all diaminocyclohexane and basic impurities. The temperature of the neutralized mixture was 60° C. The mixture was cooled over night at a temperature of 25° C. and then filtered to recover the precipitated product.

The solid was washed on the filter with 200 ml. of distilled water at room temperature whereupon it was removed from the filter and washed with 1 liter of boiling water for about 30 minutes before filtering on a suction filter. The solid was again removed from the filter and washed with 1.5 liters of boiling water for 20 minutes before filtering and then drying in a vacuum oven overnight at 60° C. The dried solid had a slight pink color and amounted to approximately 230 grams of trans 1,2-diaminocyclohexane sulfate equivalent to a 63.5% yield based on the trans 1,2-diaminocyclohexane present in the starting isometric mixture.

A total of 102 grams of the sulfate salt obtained in the above step was divided for convenience in handling into three portions, each of which was mixed with about its own weight of water to a total volume of 100 ml. and stirred to effect solution. The salt-water solutions were cooled in an ice water bath and a 50% sodium hydroxide solution added slowly in small increments until a pH of 8 was observed. The temperature of the reaction mixtures was not allowed to exceed 30° C. during the addition of the sodium hydroxide solution.

The reaction mixtures were then cooled to 25° C. and extracted with ether and then with a 9:1 ether:n-butanol mixture to remove the liberated trans 1,2-diaminocyclohexane. The extract solutions were then combined and the ether removed by evaporation.

The resulting trans 1,2-diaminocyclohexane concentrate was fractionated on a 100 plate Podbielniak column at 50-52 mm. pressure, whereupon there was obtained a final yield of 52 ml. or 49.0 grams of substantially pure trans 1,2-diaminocyclohexane. Since the theoretical yield was 54.5 grams, the percentage yield was 89.9%, based on the sulfate salt neutralized.

Gas chromatographic analysis of the final product showed it to be approximately 95% pure trans 1,2-diaminocyclohexane. The 5% impurity consisted primarily of the cis form of 1,2-diaminocyclohexane.

The above-described invention provides a simple and efficient method for the recovery of highly pure trans 1,2-diaminocyclohexane from mixtures thereof with the cis isomer as well as other impurities that may be present when the initial crude mixture is obtained as a by-product in the hydrogenation of adiponitrile during the manufacture of nylon.

It is apparent that numerous widely varying embodiments of this invention may be made without departing from the spirit and scope thereof and therefore it is not intended to be limited except as indicated in the appended claims.

What is claimed is:

1. A process for preparing substantially pure trans 1,2-diaminocyclohexane from a mixture comprising trans 1,2-diaminocyclohexane and cis 1,2-diaminocyclohexane comprising adding an aqueous solution of sulfuric acid to an aqueous solution of said mixture until a pH no greater than 3.0 is obtained, then cooling the reaction mixture to a temperature no higher than 30° C. prior to separating the precipitated sulfate salt of trans 1,2-diaminocyclohexane which is formed, and thereafter treating an aqueous solution of said salt with an aqueous alkali metal hydroxide solution while maintaining the reaction mixture at a temperature no higher than 30° C. to liberate substantially pure trans 1,2-diaminocyclohexane.

2. The process according to claim 1 wherein the separated precipitated sulfate salt of trans 1,2-diaminocyclohexane is washed at least once with boiling water.

3. A process for preparing substantially pure trans 1,2-diaminocyclohexane from a mixture comprising trans 1,2-diaminocyclohexane and cis 1,2-diaminocyclohexane comprising adding an aqueous solution of sulfuric acid to an aqueous solution of said mixture, separating the precipitated sulfate salt of trans 1,2-diaminocyclohexane which is formed, and thereafter treating an aqueous solution of said salt with a 50% solution of sodium hydroxide in water while maintaining the temperature of the reaction mixture no higher than 30° C. to liberate substantially pure trans 1,2-diaminocyclohexane.

4. A process for preparing substantially pure trans 1,2-diaminocyclohexane from a mixture comprising trans 1,2-diaminocyclohexane and cis 1,2-diaminocyclohexane comprising adding an aqueous solution of sulfuric acid to an aqueous solution of said mixture, separating the precipitated sulfate salt of trans 1,2-diaminocyclohexane which is formed, and thereafter treating an aqueous solution of said salt with an aqueous alkali metal hydroxide solution while maintaining the reaction mixture at a temperature no higher than 30° C. to liberate substantially pure trans 1,2-diaminocyclohexane, extracting the liquid phases of the resulting reaction mixture with a medium selected from the group consisting of ether and ether:alkanol mixtures, evaporating the ether extractant, and fractionally distilling the resulting concentrated extract to obtain substantially pure trans 1,2-diaminocyclohexane.

5. The process according to claim 4 wherein the extracting medium is a mixture of ether and n-butanol.

References Cited by the Examiner

UNITED STATES PATENTS

| 2,494,563 | 1/50 | Kirk et al. | 260—563 |
| 2,852,560 | 9/58 | Brust | 260—563 |

FOREIGN PATENTS 1,054,999  10/53  France.

OTHER REFERENCES

Einborn et al.: Ann. der Chem., vol. 295, pp. 209–222 (1897).

CHARLES B. PARKER, *Primary Examiner.*

L. ZITVER, *Examiner.*